(12) United States Patent
Tang et al.

(10) Patent No.: US 12,308,460 B2
(45) Date of Patent: May 20, 2025

(54) BATTERY, POWERED DEVICE, AND METHOD OF MANUFACTURING BATTERY

(71) Applicant: CONTEMPORARY AMPEREX TECHNOLOGY (HONG KONG) LIMITED, Hong Kong (CN)

(72) Inventors: Yu Tang, Ningde (CN); Peng Wang, Ningde (CN); Hong Wang, Ningde (CN); Junrong Li, Ningde (CN); Yudong Qiu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 432 days.

(21) Appl. No.: 17/897,412

(22) Filed: Aug. 29, 2022

(65) Prior Publication Data
US 2023/0035703 A1    Feb. 2, 2023

Related U.S. Application Data

(63) Continuation of application No. PCT/CN2021/109667, filed on Jul. 30, 2021.

(51) Int. Cl.
*H01M 50/284* (2021.01)
*H01M 50/543* (2021.01)

(52) U.S. Cl.
CPC ....... *H01M 50/284* (2021.01); *H01M 50/543* (2021.01); *H01M 2220/20* (2013.01)

(58) Field of Classification Search
CPC ............ H01M 50/284; H01M 50/569; H01M 50/519; H01M 10/425; H01M 2010/4271; H01M 10/427
See application file for complete search history.

(56) References Cited

U.S. PATENT DOCUMENTS

| | | |
|---|---|---|
| 2002/0051906 A1 | 5/2002 | Wakata et al. |
| 2007/0264563 A1 | 11/2007 | Yoon et al. |

(Continued)

FOREIGN PATENT DOCUMENTS

| | | |
|---|---|---|
| CN | 103296321 A | 9/2013 |
| CN | 203503754 U | 3/2014 |

(Continued)

OTHER PUBLICATIONS

The World Intellectual Property Organization (WIPO) International Search Report and written opinion for PCT/CN2021/109667 Apr. 26, 2022 14 pages (including English translation).

(Continued)

*Primary Examiner* — Maria Laios
*Assistant Examiner* — Jordan E Berresford
(74) *Attorney, Agent, or Firm* — ANOVA LAW GROUP, PLLC

(57) ABSTRACT

A battery includes a battery pair and an information collector configured to collect parameters of the battery. The battery pair includes two battery cells. A surface of each of the two battery cells is provided with a pole. The poles of the two battery cells abut against each other face to face to form a pole assembly structure. The pole assembly structure includes an insertion slot. The information collector includes a main board and a sampling piece electrically connected to the main board. One end of the sampling piece extends into the insertion slot and is electrically connected to the pole assembly structure.

16 Claims, 10 Drawing Sheets

(56) References Cited

U.S. PATENT DOCUMENTS

| | | | |
|---|---|---|---|
| 2013/0224564 A1 | 8/2013 | Kim | |
| 2015/0303440 A1 | 10/2015 | Cho et al. | |
| 2016/0277879 A1 | 9/2016 | Daoura et al. | |
| 2017/0125855 A1* | 5/2017 | Gong | H01M 10/482 |
| 2020/0243896 A1 | 7/2020 | Zhang et al. | |
| 2020/0328385 A1* | 10/2020 | Hou | H01M 50/507 |
| 2023/0216163 A1 | 7/2023 | Deng et al. | |

FOREIGN PATENT DOCUMENTS

| | | |
|---|---|---|
| CN | 206878083 U | 1/2018 |
| CN | 108075079 A | 5/2018 |
| CN | 208655773 U | 3/2019 |
| CN | 111477826 A | 7/2020 |
| CN | 111525051 A | 8/2020 |
| CN | 111834578 A | 10/2020 |
| CN | 211907567 U | 11/2020 |
| CN | 112072017 A | 12/2020 |
| CN | 212113791 U | 12/2020 |
| CN | 212848640 U | 3/2021 |
| CN | 112838333 A | 5/2021 |
| CN | 213304300 U | 5/2021 |
| EP | 2937706 A1 | 10/2015 |
| EP | 3128599 A1 | 2/2017 |
| JP | 2003197166 A | 7/2003 |
| JP | 2012523087 A | 9/2012 |
| JP | 2021012864 A | 2/2021 |
| JP | 2021111531 A | 8/2021 |
| JP | 2021535556 A | 12/2021 |
| JP | 2022523847 A | 4/2022 |
| KR | 20070080862 A | 8/2007 |
| KR | 20140077234 A | 6/2014 |
| WO | 2010087472 A1 | 8/2010 |
| WO | 2018157557 A1 | 9/2018 |
| WO | 2019148643 A1 | 8/2019 |
| WO | 2021098761 A1 | 5/2021 |

OTHER PUBLICATIONS

The European Patent Office (EPO) The Extended European Search Report for 21928369.4 Oct. 11, 2023 8 Pages.

The Japan Patent Office (JPO) Notice of Reasons for Refusal for Application No. 2022-550846 Sep. 19, 2023 6 Pages (Including Translation).

China National Intellectual Property Administration (CNIPA) Office Action 1 for Application No. 202180054577.9 Mar. 30, 2024 14 Pages (including translation).

State Intellectual Property Office of China Notice of Grant of Invention Patent Right for Application No. 202180054577.9 Jun. 5, 2024 3 pages (including translation).

The Japan Patent Office (JPO) Decision to Grant a Patent for Application No. 2022-550846 Jan. 16, 2024 6 Pages (including translation).

Korean Intellectual Property Office (KIPO) Office Action 1 for Application No. 10-2022-7029574 Jul. 2, 2024 22 Pages (including translation).

The Korean Intellectual Property Office Notice of Allowance for No. 10-2022-7029574 Jan. 14, 2025 6 Pages (including translation).

* cited by examiner

BATTERY, POWERED DEVICE, AND METHOD OF MANUFACTURING BATTERY

CROSS-REFERENCE TO RELATED APPLICATION

This application is a continuation of International Application No. PCT/CN2021/109667, filed on Jul. 30, 2021, the entire content of which is incorporated herein by reference.

TECHNICAL FIELD

This disclosure relates to the field of battery technologies, and in particular, to a battery, an electric device (powered device), and a preparation method of battery (method of manufacturing battery).

BACKGROUND

Energy conservation and emission reduction are keys to sustainable development in automobile industry. In this case, electric vehicles, with their advantages in energy conservation and emission reduction, have become an important part of sustainable development in the automobile industry. Battery technology is crucial to the development of electric vehicles. With the development of technologies, high endurance is an important aspect of battery technologies. In the current electrochemical system, for batteries of the same volume or weight, energy density is a key constraint on their endurance. Therefore, it is an urgent need to find a way to improve the energy density of batteries in battery technologies.

SUMMARY

This disclosure provides a battery, an electric device, and a preparation method of battery, so as to improve the energy density of batteries.

A first aspect of this disclosure provides a battery, including:
  a battery pair, including two battery cells, where the battery cell includes a first surface provided with a pole; the poles provided on the first surfaces of the two battery cells abut against each other face to face to form a pole assembly structure; and the pole assembly structure includes an insertion slot, and
  an information collector configured to collect parameters of the battery, where the information collector includes a main board and a sampling piece electrically connected to the main board, one end of the sampling piece extending into the insertion slot and being electrically connected to the pole assembly structure.

In the battery, the poles provided on the first surfaces of the two battery cells abut against each other face to face to form a pole assembly structure, so that the two battery cells in the battery pair are electrically connected to each other directly. In comparison with related technologies, this disclosure improves an arrangement of the battery cells, and removes an aluminum connecting piece between adjacent battery cells which is configured to electrically connect the poles. The insertion slot is provided on the pole assembly structure, and one end of the sampling piece of the information collector extends into the insertion slot and is electrically connected to the pole assembly structure, which can make full use of space for electrical connection between battery cells to complete collection of battery parameter signals without occupying extra space. This eliminates space required for the aluminum connecting piece in current flowing, welding, and sampling point arrangement, which helps improve space utilization in a height direction of the pole of the battery cell, thus improving energy density of the battery.

In the battery according to some embodiments, an accommodation space is formed between the first surfaces of the two battery cells, and the main board is located in the accommodation space. The main board of the information collector is arranged in the accommodation space between the two battery cells of the battery pair, occupying no space in a height direction of the battery, so that a volume of space occupied by a battery pack can be reduced.

In the battery according to some embodiments, the one end of the sampling piece fits with the insertion slot in shape. This allows a larger contact area between the sampling piece and the pole assembly structure, facilitating collection of accurate and stable signals by the sampling piece, and further facilitating accurate positioning of the sampling piece so that it can be connected to the pole assembly structure in a more reliable manner.

In the battery according to some embodiments, the two poles of the pole assembly structure are welded to each other; and/or the sampling piece is welded to the pole assembly structure.

With two welded poles of the pole assembly structure of the two battery cells in the battery pair, the two battery cells of the battery pair are formed into an integral structure through the pole assembly structure, thus enhancing overall strength and rigidity of the battery pair. Correspondingly, requirements for strength and rigidity of a housing of the battery may be reduced according to the overall strength and rigidity of the battery pair. For example, stiffening beams of the housing may be reduced or even eliminated, thus further improving the space utilization. In addition, as the two battery cells of the battery pair are welded to each other, the grouped battery cells are highly integrated, which facilitates quick assembly of the battery. The sampling piece and the pole assembly structure are welded to each other, thereby forming stable mechanical connection and electrical connection there, which facilitates the sampling piece to maintain its sampling position, so as to stably and accurately collect battery parameter signals.

In the battery according to some embodiments, the insertion slot has an opening on a surface of the pole assembly structure at a side close to the main board; and/or the insertion slot has an opening on a surface of the pole assembly structure adjacent to the surface at the side close to the main board. The foregoing opening location facilitates to design a reasonable size of the sampling piece and combine the information collector and the pole assembly structure. In the battery according to some embodiments, the insertion slot is a through slot or a bottomed slot. The insertion slot being a through slot can help to save pole material, reduce weight of the battery cells, and save material cost; and the insertion slot being a bottomed slot can help reduce influence of the insertion slot on a current flowing area.

In the battery according to some embodiments, the insertion slot is located between the two poles and includes a recess provided on at least one of the two poles. With the insertion slot located between the two poles, an insertion slot structure may be formed on a surface of the poles, which facilitates to form the insertion slot and combine the sampling piece and the insertion slot, and more accurately position the sampling piece and the insertion slot, thereby facilitating stably and accurately collect the battery parameter signals.

In the battery according to some embodiments, the two poles include an aluminum pole and a copper-aluminum composite pole, where the recess is provided on the aluminum pole and an end of the recess opposite the opening of the insertion slot is closed; and/or the recess is provided on the copper-aluminum composite pole and an end of the recess opposite the opening of the insertion slot is open. A technical solution in which the recess is provided on the aluminum pole and an end of the recess opposite the opening of the insertion slot is closed helps to increase a current flowing area between the aluminum pole and the copper-aluminum composite pole. That the recess is provided on the copper-aluminum composite pole and an end of the recess opposite the opening of the insertion slot is open can help save materials of the copper-aluminum composite pole, and reduce cost and weight of the battery.

In the battery according to some embodiments, the battery includes a plurality of such battery pairs, the plurality of battery pairs being arranged side by side, and the plurality of battery pairs are arranged into a pack with multiple battery pairs connected in parallel as one group, where the multiple battery pairs connected in parallel as one group are electrically connected to the main board through at least one sampling piece, and/or the plurality of battery pairs are arranged into a pack with each battery pair connected as one group, where each battery pair connected as one group is electrically connected to the main board through one sampling piece. The battery cells can be arranged into a pack with each battery cell connected as one group and/or with multiple battery cells connected in parallel as one group, to meet various voltage requirements of electrical device.

In the battery according to some embodiments, a part of the sampling piece outside the insertion slot includes a bending portion. The bending portion is arranged so that the sampling piece has a given deformability when the battery cells are stressed or temperature changes which subjects a weld joint between the sampling piece and the pole assembly structure to a small destructive force, thereby improving reliability of connection between the sampling piece and the pole assembly structure. Because of the deformability of the sampling piece, a destructive force between the sampling piece and the main board is also small, which helps prevent the sampling piece and the main board from breakage or detachment due to tearing between the sampling piece and the main board, thereby helping prevent the breakage or detachment from causing battery parameter signals unstable or failure in collection of the battery parameter signals.

In the battery according to some embodiments, an outer edge of the main board at a side away from the pole assembly structure is located inward from an outer edge of the first surface. In this way, the accommodation space between the first surfaces of the two battery cells of the battery pair can be better utilized, and the main board may completely occupy no space exceeding a height of an upper surface of the battery cells.

A second aspect of this disclosure provides an electric device, including the battery according to the first aspect of this disclosure, where the battery is configured to supply electric energy. The electric device has the same advantages as the battery according to the embodiments of this disclosure.

A third aspect of this disclosure provides a preparation method of battery, including:

providing a battery pair, where the battery pair includes two battery cells; the battery cell includes a first surface provided with a pole; the poles provided on the first surfaces of the two battery cells abut against each other face to face to form a pole assembly structure; and the pole assembly structure includes an insertion slot;

providing an information collector, where the information collector is configured to collect parameters of the battery and includes a main board and a sampling piece electrically connected to the main board; and extending one end of the sampling piece into the insertion slot, where a free end of the sampling piece is electrically connected to the pole assembly structure.

In a battery prepared according to this preparation method of battery, space required for an aluminum connecting piece in current flowing, welding, and sampling point arrangement of is eliminated, which helps improve space utilization in a height direction of the pole of battery cell, thus improving energy density of the battery.

In the preparation method of battery according to some embodiments, the preparation method includes: welding the two poles of the pole assembly structure to each other; and/or welding the sampling piece to the pole assembly structure.

In a battery prepared according to this preparation method of battery, the two poles of the pole assembly structure of the two battery cells in the battery pair are welded, which enhances overall strength and rigidity of the battery pair. Correspondingly, requirements for strength and rigidity of a housing of the battery may be reduced. In this way, space utilization can be further improved, and the grouped battery cells are highly integrated, which facilitates quick assembly of the battery. The sampling piece and the pole assembly structure are welded to each other, so that battery parameter signals can be collected in a stable and accurate manner.

In the preparation method of battery according to some embodiments, the providing a battery pair includes: forming an opening of the insertion slot, on a surface of the pole assembly structure at a side close to the main board; and/or forming an opening of the insertion slot, on a surface of the pole assembly structure adjacent to the surface at the side close to the main board.

In the preparation method of battery according to some embodiments, the providing a battery pair includes: forming a recess on one of the poles of the pole assembly structure to form the insertion slot; and/or forming a recess on both of the poles of the pole assembly structure to form the insertion slot.

In a battery prepared according to this preparation method of battery, this preparation method facilitates to form the insertion slot and combine the sampling piece and the insertion slot, and more accurately position the sampling piece and the insertion slot, thereby facilitating stably and accurately collect the battery parameter signals.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skills in the art may still derive other drawings from the accompanying drawings without creative efforts.

Figure 1:
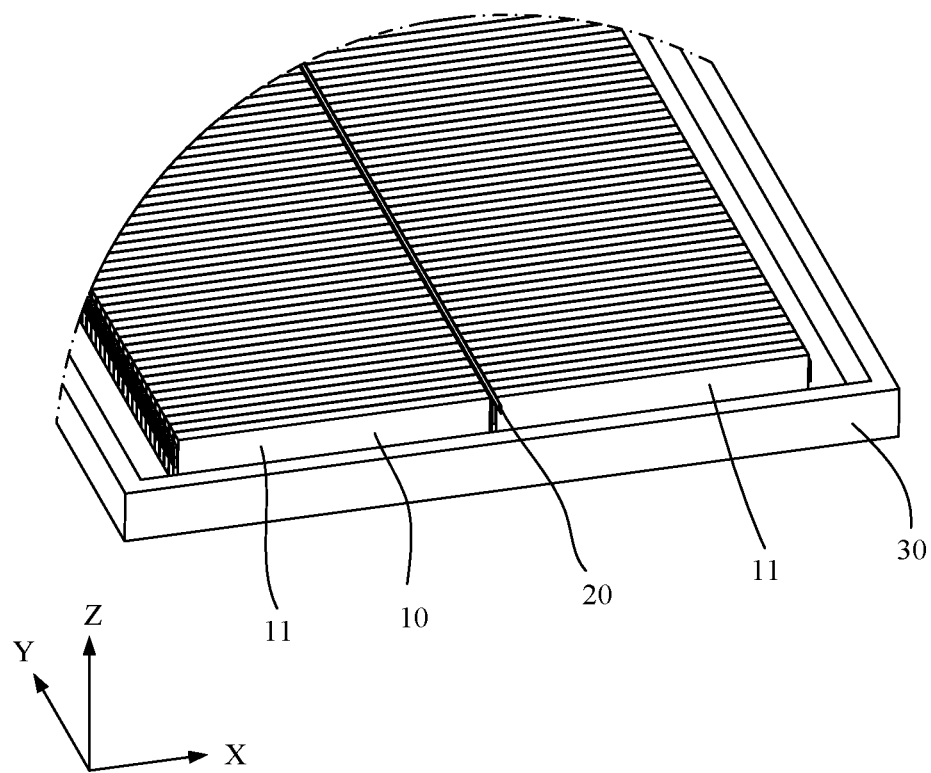
FIG. 1 is a first schematic structural diagram of some composition members of a battery according to an embodiment of this disclosure.

The accompanying drawings are not necessarily drawn to scale.

DESCRIPTION OF EMBODIMENTS

The following further describes the embodiments of this disclosure in detail with reference to the accompanying drawings and implementations. The detailed description and accompanying drawings of the following embodiments are used to exemplarily illustrate the principle of this disclosure, but are not intended to limit the scope of this disclosure, that is, this disclosure is not limited to the described embodiments.

In the descriptions of this disclosure, it should be noted that, unless otherwise stated, "a plurality of" means two or more; and the orientations or positional relationships indicated by the terms "upper", "lower", "left", "right", "inside", "outside", and the like are merely intended to help the descriptions of this disclosure and simplify the descriptions other than indicate or imply that the apparatuses or components must have specific orientations, or be constructed and manipulated with specific orientations, and therefore shall not be construed as limitations on this disclosure. In addition, the terms "first", "second", and "third", and the like are merely intended for a purpose of description, and shall not be understood as an indication or implication of relative importance. "Vertical" is not strictly vertical, but within an allowable range of error. "Parallel" is not strictly parallel, but within an allowable range of error.

The words of orientation appearing in the following description are all directions shown in the drawings, and do not limit the specific structure of this disclosure. In the descriptions of this disclosure, it should be also noted that unless otherwise specified and defined explicitly, the terms "installing", "coupling", and "connecting" should be understood in a broad sense. For example, these terms may refer to fixed connections, or detachable connections, or integral connections, and they may refer to direct connections, or indirect connections through an intermediate medium. A person of ordinary skill in the art may understand specific meanings of the foregoing terms in this disclosure as appropriate to specific situations.

In this disclosure, the battery cell may include a lithium-ion secondary battery, a lithium-ion primary battery, a lithium-sulfur battery, a sodium-lithium-ion battery, a sodium-ion battery, a magnesium-ion battery, or the like. This is not limited in this embodiment of this application. The battery cell may be cylindrical, flat, rectangular, or another shape, and this is also not limited in the embodiments of this disclosure. The battery cell is typically divided into three types by packaging method: a cylinder cell, a prismatic cell, and a pouch battery cell, and this is also not limited in the embodiments of this disclosure.

The battery mentioned in the embodiments of this disclosure is a single physical module that includes one or more battery cells for providing a higher voltage and capacity. For example, the battery mentioned in this disclosure may include a battery module, a battery pack, or the like. Generally, a battery includes a box body configured to package one or more battery cells. The box body can prevent a liquid or another foreign matter from affecting charging or discharging of the battery cells.

A plurality of battery cells can be connected in series and/or in parallel through an electrode terminal for various application scenarios. In some high-power application scenarios such as an electric vehicle, the application of the battery includes three levels: a battery cell, a battery module, and a battery pack. The battery module is formed by electrically connecting a specific quantity of battery cells and putting the battery cells into a frame to protect the battery cells from external impact, heat, vibration, and the like. The battery pack is a final state of a battery system assembled in an electric vehicle. Generally, a battery pack includes a box body configured to package one or more battery cells. The box body can prevent a liquid or another foreign matter from affecting charging or discharging of the battery cell. Generally, a box body consists of a cover and a box shell. Most existing battery packs are manufactured by installing various control and protection systems such as a battery management system (BMS) and a thermal management component on one or more battery modules. With the development of technologies, the battery module may be omitted, that is, the battery pack is directly formed using battery cells. With this improvement, weight energy density and volumetric energy density of the battery system are improved, and the number of parts is remarkably reduced. The battery mentioned in this disclosure includes a battery module or a battery pack.

The battery cell refers to a smallest unit that constitutes the battery module or the battery pack. The battery cell may include an end cover, a housing, a cell assembly and other functional components.

The end cover refers to a component that covers an opening of the housing to isolate internal environment of the battery cell from external environment. Without limitation, a shape of the end cover may fit with that of the housing, so that the end cover can match the housing. Optionally, the end cover may be made of materials with given hardness and strength (for example, aluminum alloy), so that the end cover is less likely to deform when subjected to extrusion and collision, enabling the battery cell to have higher structural strength and enhanced safety performance. The end cover may be provided with functional components such as an electrode terminal. The electrode terminal may be configured to be electrically connected to the cell assembly for outputting or inputting electric energy of the battery cell. In some embodiments, the end cover may also be provided with a pressure relief mechanism configured to release internal pressure when the internal pressure or temperature in the battery cell reaches a threshold. The end cover may also be made of various materials, such as copper, iron, aluminum, stainless steel, aluminum alloy, plastic, or the like, which are not particularly limited in this embodiment of this disclosure. In some embodiments, an insulator may also be disposed at an inner side of the end cover. The insulator can be configured to isolate electrical connection parts in the housing from the end cover, thereby reducing a risk of short circuit. For example, the insulator may be made of plastic, a rubber, or the like.

The housing is a component configured to form the internal environment of the battery cell together with the end cover, where the formed internal environment may be used to contain the cell assembly, electrolyte, and other components. The housing and the end cover may be indepenrecess components, and an opening may be provided in the housing, so that the end cover can close the opening to form the internal environment of the battery cell. The housing may be of various shapes and sizes, for example, rectangular, cylindrical, hexagonal, or the like. Specifically, the shape of the housing may be determined based on a specific shape and size of the cell assembly. The housing may be made of various materials, such as copper, iron, aluminum, stainless steel, aluminum alloy, plastic, or the like, which are not particularly limited in this embodiment of this disclosure.

The cell assembly is a component in which electrochemical reactions take place in the battery cell. There may be one or more battery assemblies in the housing. The cell assembly is mainly formed by winding or stacking a positive electrode plate and a negative electrode plate, and a separator is generally disposed between the positive electrode plate and the negative electrode plate. Parts of the positive electrode plate and the negative electrode plate with active substances constitute a body portion of the cell assembly, while parts of the positive electrode plate and the negative electrode plate without active substances separately constitute a tab. A positive tab and a negative tab may both be located at one end of the body portion or be located at two ends of the body portion respectively. During charging and discharging of the battery, a positive electrode active substance and a negative electrode active substance react with an electrolyte, and the tabs are connected to the electrode terminals to form a current loop. The electrode assembly may have a winding structure or a stacked structure, which is not limited in this embodiment of this disclosure.

Energy density of a battery may be weight energy density and volumetric energy density. This disclosure relates to the research and improvement of the volumetric energy density of batteries. This disclosure aims to study how to improve overall capacity of a battery without changing its volume, so as to improve endurance of the battery.

In the related technologies, electrical connection between a plurality of battery cells in a battery often requires an aluminum connecting piece which is configured to connect poles of the battery cells. In addition, a sampling point for collecting battery parameters such as a voltage signal needs to be connected to the aluminum connection piece. Limited by a current flowing area, a welding device, electrical connection reliability, and other requirements, the aluminum connecting piece needs to have a large size in order to ensure current flowing and sampling reliability. In addition, in order to meet the requirements for welding and electrically insulating the aluminum connecting piece, in a height direction of the pole of the battery cell, not only the aluminum connecting piece should be arranged but also an insulation protection space should be reserved, which leads to low space utilization in the height direction of the pole of the battery.

An embodiment of this disclosure provides a battery, where the foregoing accessories of the battery are disposed in a space formed by a battery cell structure, so that no extra space other than the battery formed by arrangement of battery cells is occupied, thereby reducing volume of the battery and improving energy density of the battery.

The embodiments of this disclosure provide a battery, an electric device, and a preparation method of battery. The electric device includes the battery according to the embodiments of this disclosure, where the battery is configured to supply electric energy to the electric device. For example, the electric device may be a vehicle, a ship, an energy storage device, or the like. For example, the battery may be a lithium-ion battery. The preparation method of battery is used to prepare the battery according to the embodiments of this disclosure.

To resolve the problem of low space utilization in the height direction of a pole of the battery in the related technologies, as shown in FIG. 1 to FIG. 15, an embodiment of this disclosure provides a battery, including a battery pair 10 and an information collector 20.

The battery pair 10 includes two battery cells 11. The battery cell 11 includes a first surface 110 provided with a pole 111. The poles 111 provided on the first surfaces 110 of the two battery cells 11 abut against each other face to face to form a pole assembly structure 101. The pole assembly structure 101 includes an insertion slot 1011.

The information collector 20 is configured to collect parameters of the battery. The information collector 20 includes a main board 21 and a sampling piece 22 electrically connected to the main board 21. One end of the sampling piece 22 extends into the insertion slot 1011 and is electrically connected to the pole assembly structure 101.

In the battery according to this embodiment of this disclosure, the poles 111 provided on the first surfaces 110 of the two battery cells 11 abut against each other face to face to form a pole assembly structure 101, so that the poles 111 of the two battery cells in the battery pair 10 are electrically connected to each other directly. In comparison with related technologies, this disclosure improves an arrangement of the battery cells, and removes an aluminum connecting piece between adjacent battery cells which is configured to electrically connect the poles. The insertion slot 1011 is provided on the pole assembly structure 101, and one end of the sampling piece 22 of the information collector 20 extends into the insertion slot 1011 and is electrically connected to the pole assembly structure 101, which can make full use of space for electrical connection between battery cells to complete collection of battery parameter signals without occupying extra space. This eliminates space required for the aluminum connecting piece in current flowing, welding, and sampling point arrangement, which helps improve space utilization in the height direction of the pole of the battery cell, thus improving energy density of the battery.

The following describes in detail the battery according to this embodiment of this disclosure with reference to FIG. 1 to FIG. 15.

As shown is FIG. 1, the battery according this embodiment of this disclosure includes a battery housing, a plurality of battery cells disposed inside the battery housing, and an information collector 20 configured to collect parameters of the battery. The battery housing includes a bottom shell 30 and a cover (not shown in the figure). The plurality of battery cells and the information collector 20 are all located in a space formed by the bottom shell 30 and the cover.

In this disclosure, the battery cell has a structure with poles provided at two ends. As shown in FIG. 1, a pole at one end of the battery cell is opposite in polarity to that at the other end of the battery cell. The poles 111 on one end surface of the two battery cells 11 forming the battery pair 10 are butted against each other. The battery cells 11 are arranged in such a way that the poles 111 are no longer located at a top of the battery, but at one side of the battery. With the plurality of paired battery cells 11 arranged sequentially in a length direction (Y direction in FIG. 1), a height in a height direction of the battery (Z direction in FIG. 1) can be effectively reduced. In addition, an electrical connection structure, such as a bus bar structure, between the poles 111 of battery cells 11 can also no longer occupy space in the height direction of the battery, thus further flattening an overall structure of the battery.

As shown in FIG. 1, the plurality of battery cells are grouped in pairs to form a plurality of battery pairs 10. Each battery pair 10 includes two battery cells 11, and the two battery cells 11 are arranged in a width direction of the battery (X direction in FIG. 1) and electrically connected to each other. As shown in FIG. 2 to FIG. 6, the battery cell 11 includes a first surface 110 provided with a pole 111. The pole 111 protrudes from the first surface 110 to facilitate the electrical connection between the battery cells 11. The pole 111 is not limited in shape, and may be in a square shape as shown in FIG. 1, a round shape, a polygonal shape, or another shape. The poles 111 provided on the first surfaces 110 of the two battery cells 11 abut against each other face to face to form a pole assembly structure 101, and the pole assembly structure 101 includes an insertion slot 1011. The information collector 20 includes a main board 21 and a sampling piece 22 electrically connected to the main board 21. One end of the sampling piece 22 extends into the insertion slot 1011 and is electrically connected to the pole assembly structure 101.

The sampling piece 22 is made of a conductive material, so as to deliver signals collected from the pole assembly structure 101 to the main board 21. The sampling piece 22 is, for example, a nickel piece.

In the embodiment shown in FIG. 1 to FIG. 6, two poles 111 of each battery cell 11 are disposed at two ends of the battery cell 11 respectively, the poles 111 provided on the first surfaces 110 of the two battery cells 11 in each battery pair 10 abut against each other face to face to form a pole assembly structure 101, and the two poles 111 of the pole assembly structure 101 are welded to each other. In this way, the two battery cells 11 form the battery pair 10, and a plurality of battery pairs 10 are arranged into a pack. With the two welded poles 111 of the pole assembly structure 101 of the two battery cells 11 in the battery pair 10, the two battery cells 11 of the battery pair 10 are formed into an integral structure through the pole assembly structure 101, thus enhancing overall strength and rigidity of the battery pair 10. Correspondingly, requirements for strength and rigidity of a housing of the battery may be reduced according to the overall strength and rigidity of the battery pair 10. For example, stiffening beams of the housing may be reduced or even eliminated, thus further improving the space utilization. In addition, as the two battery cells 11 of the battery pair 10 are welded to each other, the grouped battery cells are highly integrated, which facilitates quick assembly of the battery.

In the embodiment shown in FIG. 1 to FIG. 6, the sampling piece 22 is welded to the pole assembly structure 101. In such an arrangement, the sampling piece 22 and the pole assembly structure 101 are welded to each other, thereby forming stable mechanical connection and electrical connection therebetween, which facilitates the sampling piece 22 to maintain its sampling position, so as to stably and accurately collect battery parameter signals.

Figure 5:
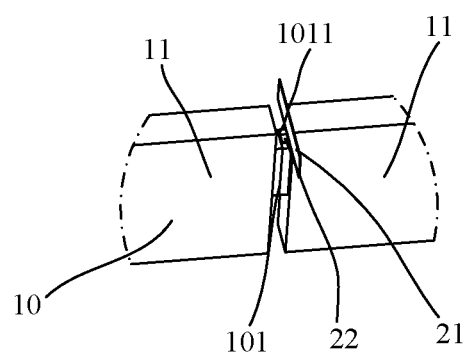
FIG. 5 is a schematic diagram showing a combined structure of a battery pair and an information collector in the battery in the embodiment shown in FIG. 1, where some structures of the information collector are shown.

As shown in FIG. 5, a weld joint between the sampling piece 22 and the pole assembly structure 101 is located at an opening of the insertion slot 1011. The weld joint is located at a junction between the two poles 111 at a top of the pole assembly structure 101 and the sampling piece 22, and can weld the two poles 111 of the pole assembly structure 101 and the sampling piece 22 together. In order to achieve a solid connection of the two poles 111 of the pole assembly structure 101, weld joint(s) or welding spot(s) may also be provided at other position(s) of the junction between the two poles 111 of the pole assembly structure 101, for example, at two sides and/or a lower end of the pole assembly structure 101 in FIG. 5, to ensure joint strength of the two poles 111.

The sampling piece 22 and the pole assembly structure 101 can be fastened by welding while the two poles 111 of the pole assembly structure 101 are butt-welded, to meet requirements for current flowing and sampling information delivery.

Figure 4:
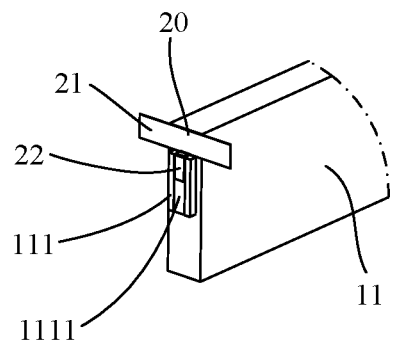
FIG. 4 is a schematic diagram showing a combined structure of a battery cell in a battery pair and an information collector in the battery in the embodiment shown in FIG. 1, where some structures of the information collector are shown.

As shown in FIG. 1, FIG. 4, and FIG. 5, an accommodation space is formed between the first surfaces 110 of the two battery cells 11, and the main board 21 is located in the accommodation space. The main board 21 of the information collector 20 is arranged in the accommodation space between the two battery cells 11 of the battery pair 10, occupying no space in the height direction of the battery, so that a volume of space occupied by a battery pack can be reduced.

In some embodiments, the insertion slot 1011 is a through slot or a bottomed slot. The insertion slot 1011 and its opening may also be provided at another suitable location in the pole assembly structure 101. For example, the insertion slot 1011 may be located between the two poles 111 and include a recess 1111 provided on at least one of the two poles 111. For another example, the insertion slot 1011 may be provided on only one of the two poles 111.

In the embodiment shown in FIG. 1 to FIG. 6, the insertion slot 1011 is a through slot. The insertion slot 1011 is located between the two poles 111 and includes a recess 1111 provided on one of the two poles 111.

Figure 6:
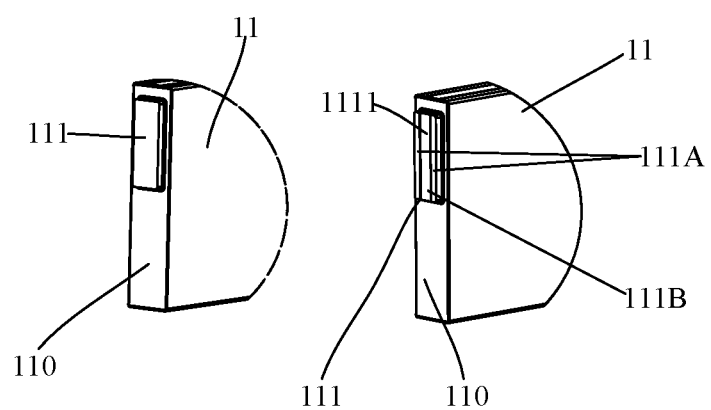
FIG. 6 is a schematic structural diagram of an insertion slot in a pole assembly structure of a battery pair in the battery in the embodiment shown in FIG. 1.

In this embodiment, the two poles 111 of the pole assembly structure 101 include an aluminum pole and a copper-aluminum composite pole. As shown in FIG. 6, the pole 111 on the first surface 110 of the battery cell 11 on a left side is an aluminum pole. The aluminum pole is electrically connected to a positive tab of a battery core of the battery cell 11 and serves as a positive electrode pole of the battery cell 11. As shown in FIG. 6, the pole 111 on the first surface 110 of the battery cell 11 on a right side is a copper-aluminum composite pole. The copper-aluminum composite pole is electrically connected to a negative tab of the battery core of the battery cell 11 and serves as a negative electrode pole of the battery cell 11. As shown in FIG. 6, the copper-aluminum composite pole includes an aluminum portion 111A and a copper portion 111B which is embedded in a mounting recess of the aluminum portion 111A. The copper portion 111B further includes an inward protruding portion passing through a bottom wall of the aluminum portion 111A. The protruding portion is configured to electrically connect (for example, weld) the positive tab of the battery core, so that the aluminum part 111B is also electrically connected with the positive tab through the copper portion 111B. The aluminum portion 111B is suitable for being welded to an aluminum pole of another battery cell 11.

Figure 2:
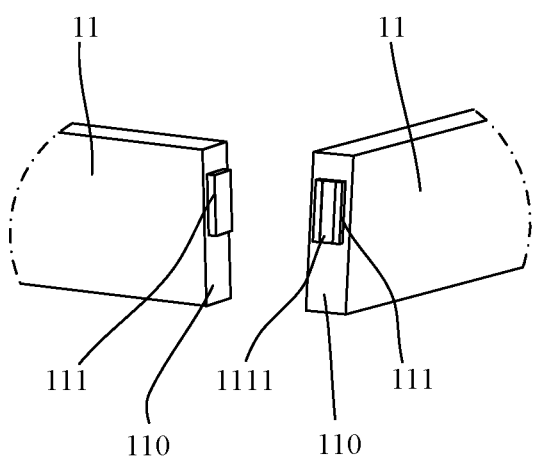
FIG. 2 is a schematic structural exploded diagram of a battery pair in the battery in the embodiment shown in FIG. 1.
Figure 3:
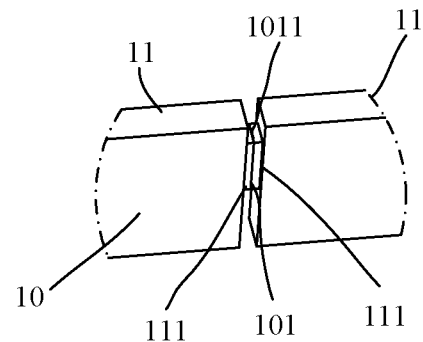
FIG. 3 is a schematic diagram showing a combined structure of a battery pair in the battery in the embodiment shown in FIG. 1.

As shown in FIG. 2, FIG. 4, and FIG. 6, the recess 1111 is provided on the copper-aluminum composite pole, and an end of the recess 1111 opposite the opening of the insertion slot 1011 is open. A surface of the aluminum pole in the pole assembly structure 101 is not provided with a recess. After the aluminum pole abuts against the copper-aluminum composite pole, the recess 1111 and a surface of the aluminum pole facing the recess 1111 form an insertion slot 1011 in a form of a through slot.

The recess 1111 is provided on the copper portion 111B of the copper-aluminum composite pole. In this embodiment, a thickness of the copper portion 111B is designed to be less than a depth of the mounting recess of the aluminum portion, so that after the copper portion 111B is assembled with the aluminum portion 111A, there is a surface height difference between the copper portion 111B and the aluminum portion 111A, naturally forming the recess 1111.

In an embodiment not shown in the figure, the thickness of the copper portion 111B may alternatively be equal to the depth of the mounting recess, and the recess 1111 may be formed on the copper portion 111B.

The recess 1111 is provided on the copper-aluminum composite pole and is arranged at the copper portion 111B in the middle of the copper-aluminum composite pole in a width direction. The recess 1111 is provided in a non-welding area, taking a middle space and a lateral space of the copper-aluminum composite pole to achieve sampling connection without affecting aluminum structures on two sides, which thereby avoids affecting a current flowing area. The aluminum pole and the aluminum portion 111A can be welded to each other to achieve a high voltage connection, thereby reducing the thickness of the copper portion 111B to form the recess 1111 with limited impact on current flowing and structural safety of the pole assembly structure. The insertion slot 1011 can be in a form of a through slot to reduce copper consumption, and reduce cost and weight of the battery.

In some embodiments, the insertion slot 1011 has an opening on a surface of the pole assembly structure 101 at a side close to the main board 21. As shown in FIG. 4 and FIG. 5, the insertion slot 1011 has an opening at the top of the pole assembly structure 101, and a part of the main board 21 is located in the accommodation space between the two first surfaces 110 above the pole assembly structure 101. This helps assembly of the information collector 20 with each battery pair 10 and assembly of the sampling piece 22 with the insertion slot 1011 in place, thereby ensuring accuracy and stability of battery parameters collected by the sampling piece 22.

In some embodiments, one end of the sampling piece 22 extending into the insertion slot 1011 fits with the insertion slot 1011 in shape. This allows a larger contact area between the sampling piece 22 and the pole assembly structure 101, facilitating collection of accurate and stable signals by the sampling piece 22, and further facilitating accurate positioning of the sampling piece 22 so that it can be connected to the pole assembly structure 101 in a more reliable manner.

In an example of this embodiment, a length of the recess 1111 forming the insertion slot 1011 is greater than 18 mm. In a width direction of the recess 1111, a distance from an edge of the recess 1111 to an edge of a pole is greater than or equal to 3 mm, a width of the recess 1111 is greater than or equal to 8 mm, and a depth of the recess 1111 is equal to 0.3 mm. The sampling piece 22 matched with the insertion slot 1011 extends into the insertion slot 1011 in a length direction of the recess 1111. A length of the sampling piece 22 inserted into the insertion slot 1011 is greater than or equal to 16 mm and is less than or equal to 18 mm, a width of the sampling piece 22 is equal to 8 mm, and a thickness of the sampling piece 22 is 0.3 mm.

As shown in FIG. 4 and FIG. 5, a part of the sampling piece 22 outside the insertion slot 1011 includes a bending portion. The bending portion is formed between the opening of the insertion slot 1011 and the main board 21, abutting against a surface of the pole assembly structure 101. In an example of this embodiment, a length of the bending portion of the sampling piece 22, that is, a distance from the opening of the insertion slot 1011 to the main board 21, is greater than 3 mm and less than 5 mm. The bending portion is arranged so that the sampling piece 22 has a given deformability when the battery cells are stressed or temperature changes, which subjects a weld joint between the sampling piece 22 and the pole assembly structure 101 to a small destructive force, thereby improving reliability of connection between the sampling piece 22 and the pole assembly structure 101. Because of the deformability of the sampling piece 22, a destructive force between the sampling piece 22 and the main board 21 is also small, which helps prevent the sampling piece 22 and the main board 21 from breakage or detachment due to tearing between the sampling piece 22 and the main board 21, thereby helping prevent the breakage or detachment from causing battery parameter signals unstable or failure in collection of the battery parameter signals.

Figure 7:
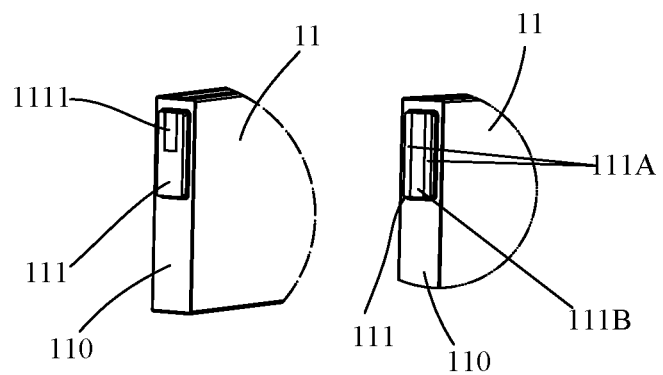
FIG. 7 is a schematic structural diagram of an insertion slot in a pole assembly structure of a battery pair in a battery according to an embodiment of this disclosure.

FIG. 7 shows an alternative embodiment of the embodiment shown in FIG. 1 to FIG. 6. A difference of the embodiment shown in FIG. 7 from the embodiment shown in FIG. 1 to FIG. 6 lies in a different arrangement of the insertion slot 1011 of the pole assembly structure 101.

As shown in FIG. 7, in this embodiment, the insertion slot 1011 is a bottomed slot. The two poles 111 of the pole assembly structure 101 include an aluminum pole and a copper-aluminum composite pole, the aluminum pole is a positive electrode pole, and the copper-aluminum composite pole is a negative electrode pole. In this embodiment, the recess 1111 is provided on the aluminum pole 111, and an end of the recess 1111 opposite the opening of the insertion slot 1011 is closed. A surface of the copper-aluminum composite pole in the pole assembly structure 101 is not provided with a recess. After the aluminum pole abuts against the copper-aluminum composite pole, the recess 1111 and a surface of the copper-aluminum composite pole facing the recess 1111 form an insertion slot 1011 in a form of a bottomed slot.

In this embodiment, a size of the recess 1111, including its length, may be arranged to fit with a part of the sampling piece 22 extending into the insertion slot 1011.

For any other parts not illustrated in the embodiment shown in FIG. 7, refer to the related content in the embodiment shown in FIG. 1 to FIG. 6.

Figure 8:
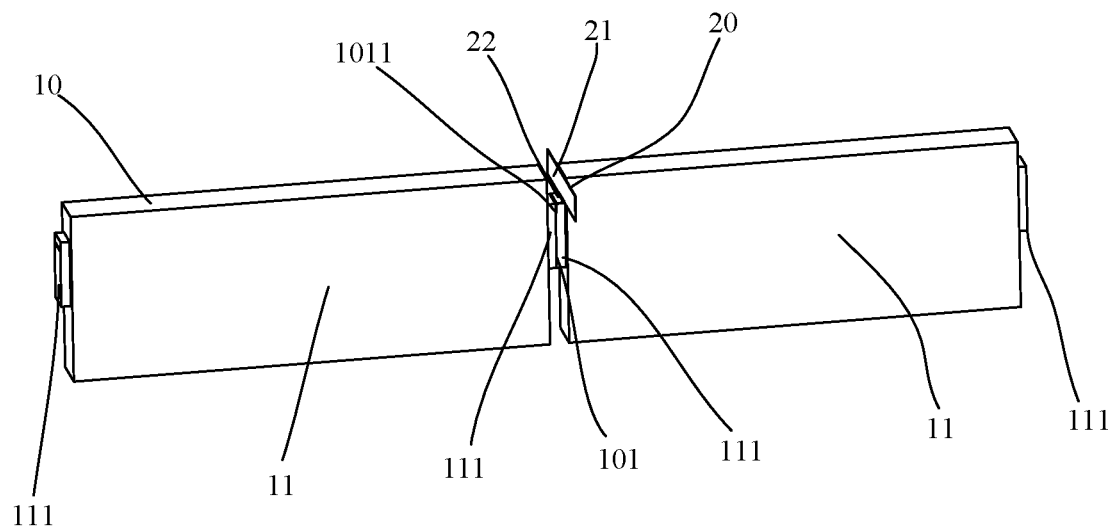
FIG. 8 is a schematic diagram showing a combined structure of a battery pair and an information collector in a battery according to an embodiment of this disclosure, where some structures of the information collector are shown.
Figure 9:
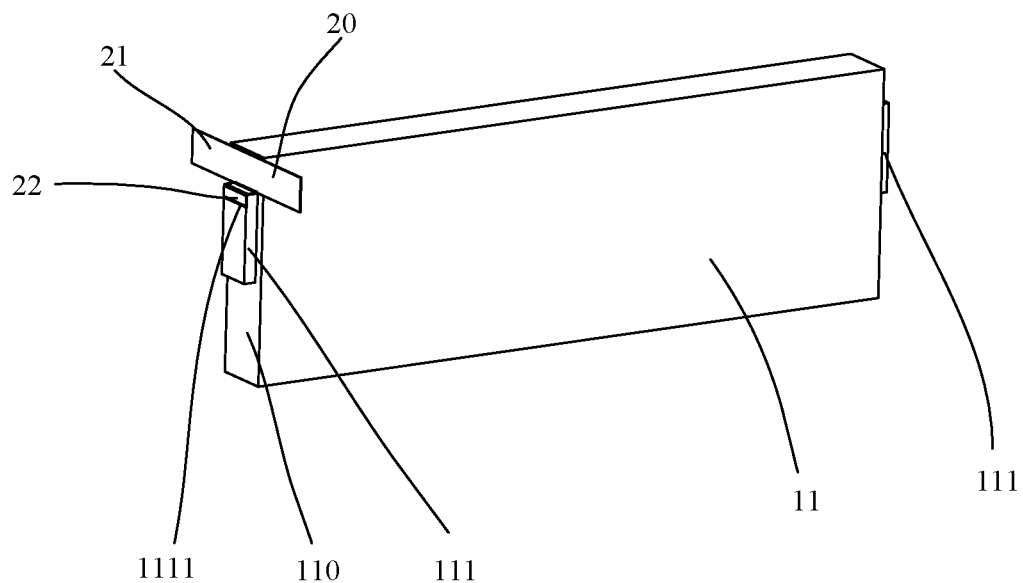
FIG. 9 is a schematic diagram showing a combined structure of a battery cell in a battery pair and an information collector in the battery in the embodiment shown in FIG. 8, where some structures of the information collector are shown.

FIG. 8 and FIG. 9 show another alternative embodiment of the embodiment shown in FIG. 1 to FIG. 6. A difference of the embodiment shown in FIG. 8 and FIG. 9 from the embodiment shown in FIG. 1 to FIG. 6 lies in a different arrangement of the insertion slot 1011 of the pole assembly structure 101 and a different arrangement of the sampling piece 22.

As shown in FIG. 8 and FIG. 9, the insertion slot 1011 has an opening on a surface of the pole assembly structure 101 at a side close to the main board 21 and on a surface of the pole assembly structure 101 adjacent to the surface at the side close to the main board 21. In this embodiment, a recess 1111 is provided on one pole 111 of the pole assembly structure 101, and the recess 1111 is equal to the pole 111 in width and has a closed bottom. In this embodiment, the sampling piece 22 is relatively wider and shorter, and extends in a width direction of the main board 21. In the width direction of the main board 21, one end of the sampling piece 22 is connected to the main board 21, and the other end is inserted into the insertion slot 1011 and welded to the pole assembly structure 101. A part of the sampling piece 22 inserted into the insertion slot 1011 is equal to the recess 1111 in width.

In this embodiment of this disclosure, as the openings are located on different sides of the pole assembly structure 101, the sampling piece 22 can extend into the insertion slot 1011 from any side. In addition, due to a large width of the sampling piece 22, an insertion depth of the sampling piece 22 into the insertion slot 1011 is small, allowing the sampling piece 22 to be more easily inserted into the insertion slot 1011, and the sampling piece 22 can be welded to the pole assembly structure 101 in more sites, so that the sampling piece 22 can be more firmly connected to the pole assembly structure 101.

In addition, as shown in FIG. 8 and FIG. 9, an outer edge of the main board 21 at a side away from the pole assembly structure 101 is located inward from an outer edge of the first surface 110. In this way, the accommodation space between the first surfaces 110 of the two battery cells 11 of the battery pair 10 can be better utilized, and the main board 21 may completely occupy no space exceeding a height of an upper surface of the battery cells 11.

In addition, as shown in FIG. 8 and FIG. 9, a part of the sampling piece 22 outside the insertion slot 1011 also includes a bending portion.

For any other parts not illustrated in the embodiment shown in FIG. 8 and FIG. 9, refer to the related content in the embodiment shown in FIG. 1 to FIG. 6.

Figure 10:
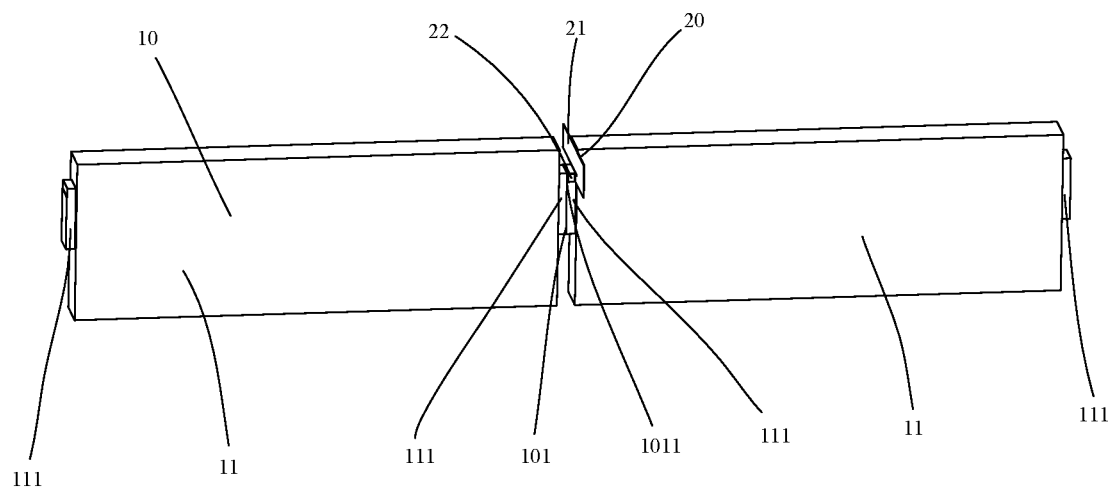
FIG. 10 is a schematic diagram showing a combined structure of a battery pair and an information collector in a battery according to an embodiment of this disclosure, where some structures of the information collector are shown.
Figure 11:
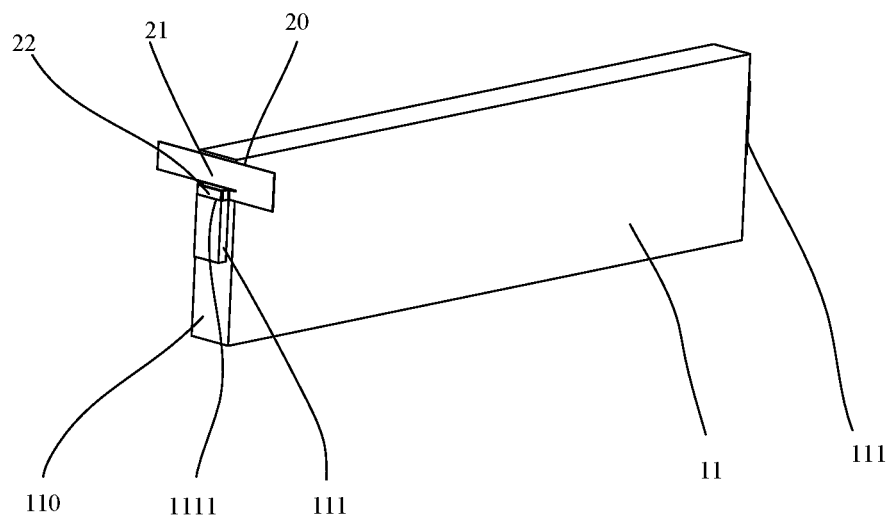
FIG. 11 is a schematic diagram showing a combined structure of a battery cell in a battery pair and an information collector in the battery in the embodiment shown in FIG. 10, where some structures of the information collector are shown.

FIG. 10 and FIG. 11 show another alternative embodiment of the embodiment shown in FIG. 1 to FIG. 6. A difference of the embodiment shown in FIG. 10 and FIG. 11 from the embodiment shown in FIG. 1 to FIG. 6 lies in a different arrangement of the insertion slot 1011 of the pole assembly structure 101 and a different arrangement of the sampling piece 22.

As shown in FIG. 10 and FIG. 11, the insertion slot of this embodiment is the same as that of the embodiment shown in FIG. 8 and FIG. 9. The insertion slot 1011 has an opening on a surface of the pole assembly structure 101 at a side close to the main board 21 and on a surface of the pole assembly structure 101 adjacent to the surface at the side close to the main board 21. A recess 1111 is provided on one pole 111 of the pole assembly structure 101, and the recess 1111 is equal to the pole 111 in width and has a closed bottom.

However, in this embodiment, a structure of the sampling piece 22 and a location for connecting the sampling piece 22 to the main board 21 are different from those in the embodiment shown in FIG. 8 and FIG. 9. In this embodiment, an extension direction of the sampling piece 22 is the same as a length direction of the main board 21. In the length direction of the main board 21, one end of the sampling piece 22 is connected to the main board 21, and the other end is inserted into the insertion slot 1011 and welded to the pole assembly structure 101.

As shown in FIG. 10 and FIG. 11, in this embodiment, an outer edge of the main board 21 at a side away from the pole assembly structure 101 is located inward from an outer edge of the first surface 110.

As shown in FIG. 10 and FIG. 11, in this embodiment, a part of the sampling piece 22 outside the insertion slot 1011 includes a bending portion.

For any other parts not illustrated in the embodiment shown in FIG. 10 and FIG. 11, refer to the related content in the embodiment shown in FIG. 1 to FIG. 6.

In an embodiment not shown in the figure, the insertion slot may only have an opening on a surface of the pole assembly structure at a side close to the main board. In this case, the sampling piece can be of an L-shaped structure, one end of the L-shaped structure is connected to the main board, and the other end is inserted into the insertion slot and welded to the pole assembly structure.

In some embodiments, the battery includes a plurality of such battery pairs 10, the plurality of battery pairs 10 being arranged side by side. The battery cells can be arranged into a pack with one battery pair connected as one group and/or with multiple battery pairs connected in parallel as one group, to meet various voltage requirements of electrical device.

Figure 12:
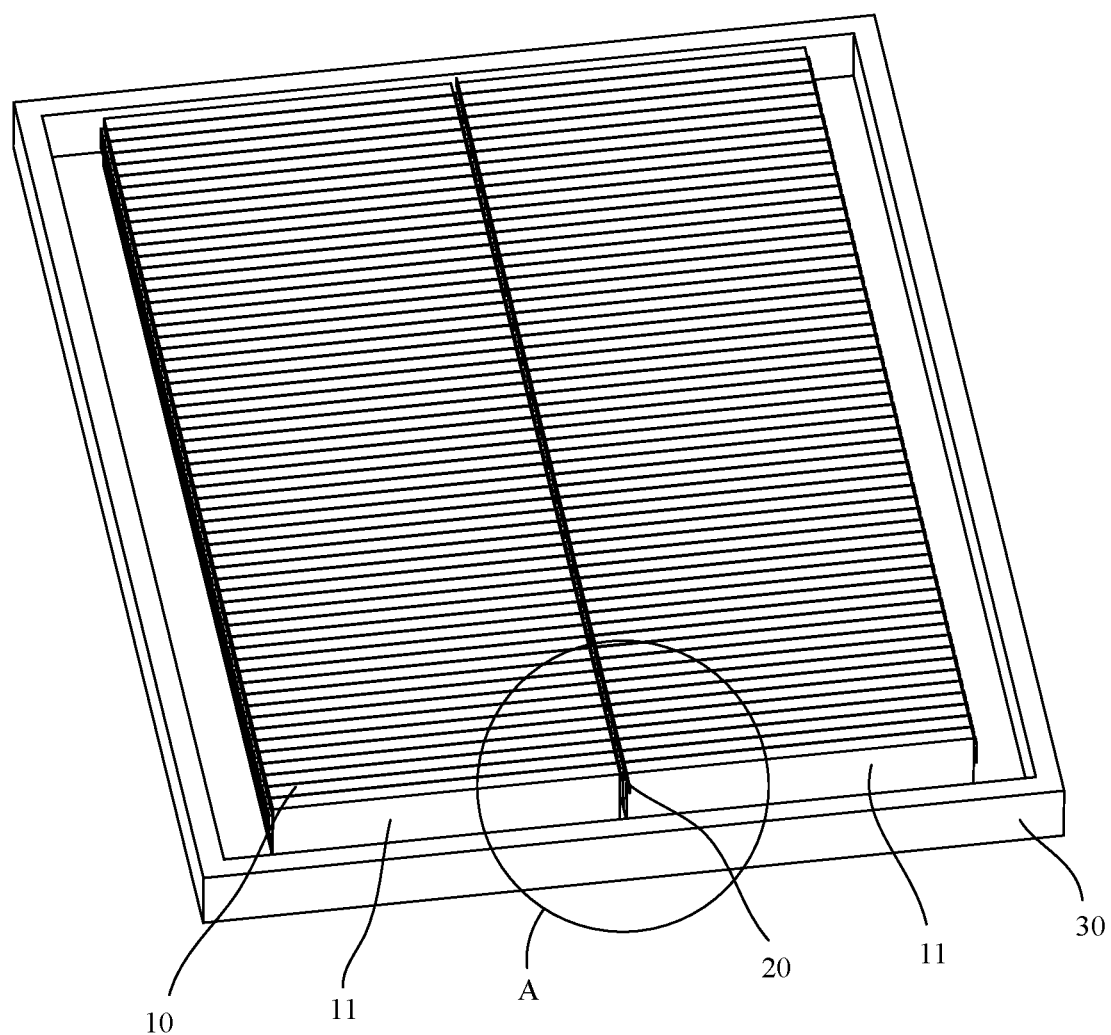
FIG. 12 is a schematic structural diagram of some composition members of a battery according to an embodiment of this disclosure, where a plurality of battery pairs are connected by being arranged into a pack with multiple battery pairs connected in parallel as one group.
Figure 13:
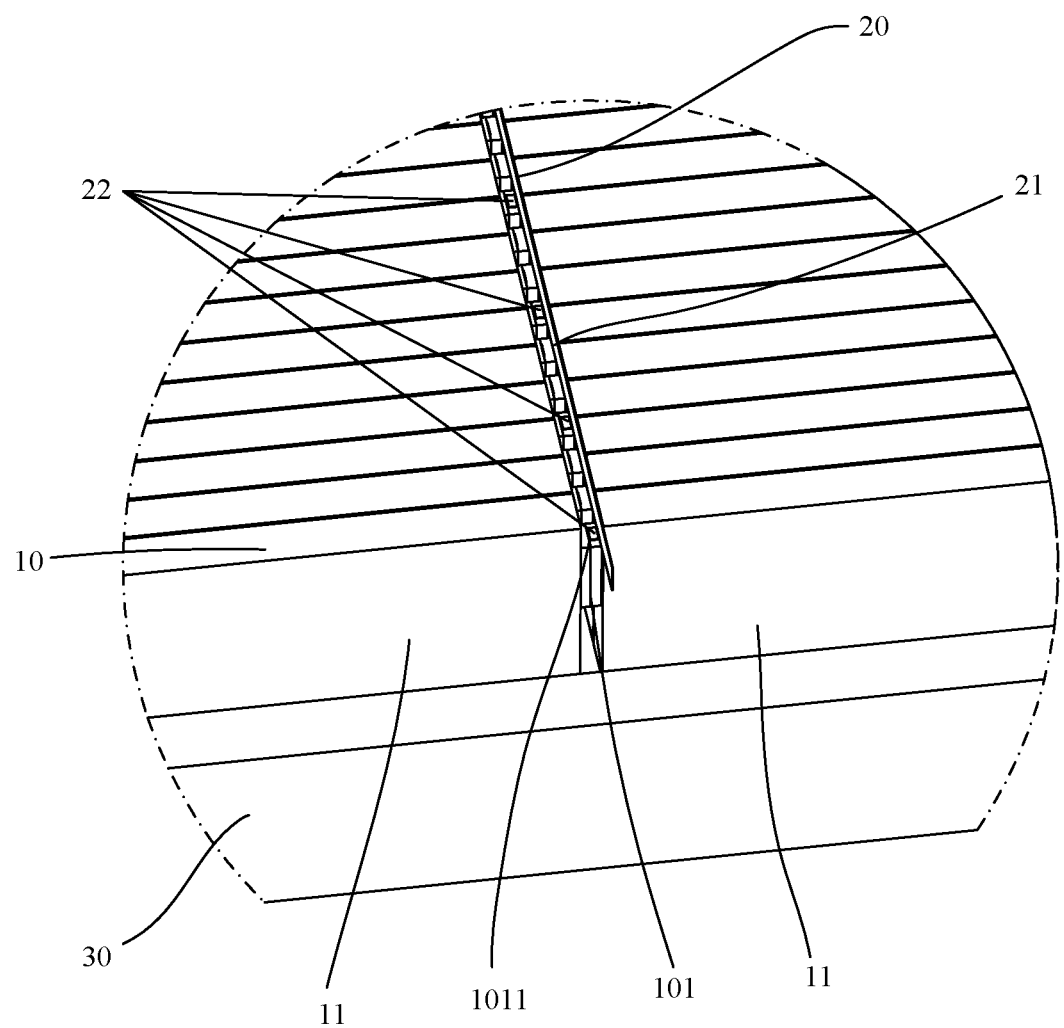
FIG. 13 is a schematic diagram of an enlarged structure of Part A in FIG. 12.

As shown in FIG. 12 and FIG. 13, in this embodiment, the plurality of battery pairs 10 are arranged into a pack with multiple battery pairs 10 connected in parallel as one group, where the multiple battery pairs 10 connected in parallel as one group are electrically connected to the main board 21 through at least one sampling piece 22.

For any other parts not illustrated in the embodiment shown in FIG. 12 and FIG. 13, refer to the related content in other embodiments.

Figure 14:
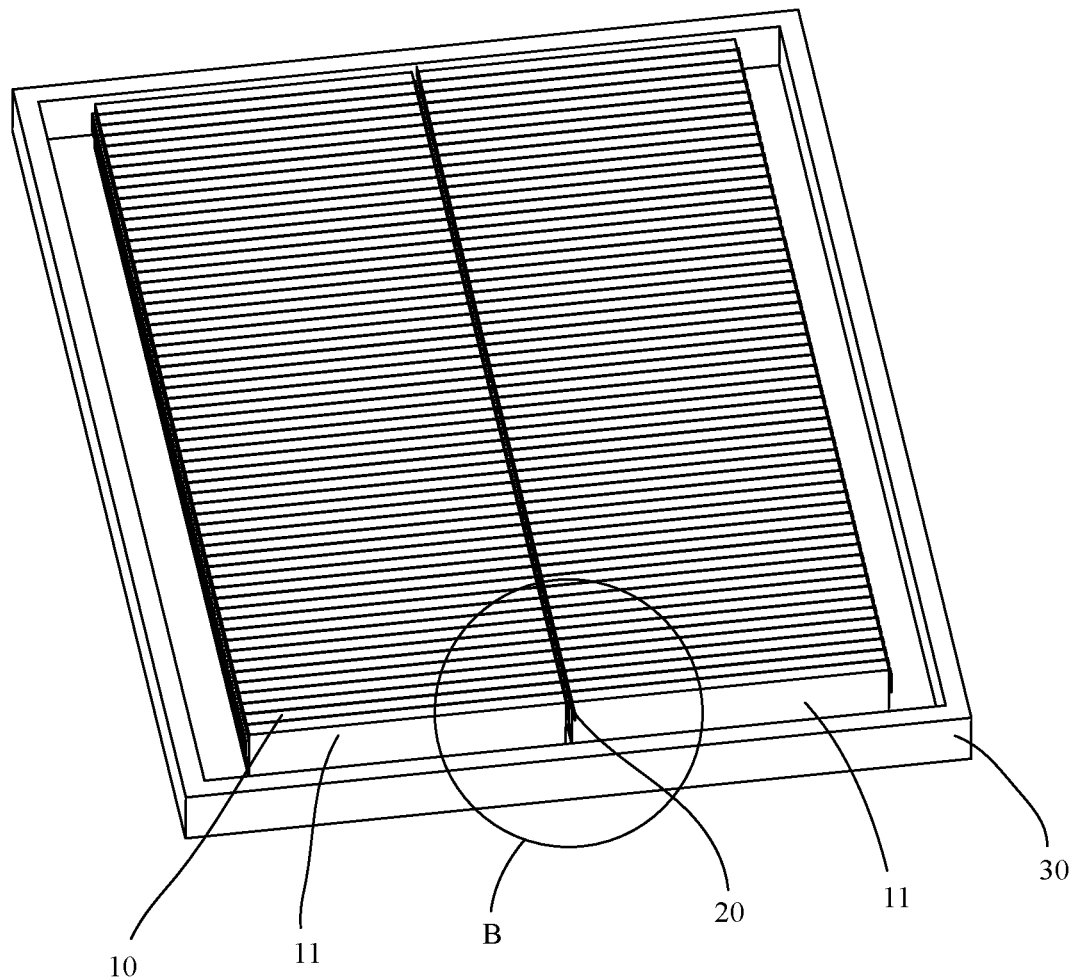
FIG. 14 is a schematic structural diagram of some composition members of a battery according to an embodiment of this disclosure, where a plurality of battery pairs are connected by being arranged into a pack with each battery pair connected as one group.
Figure 15:
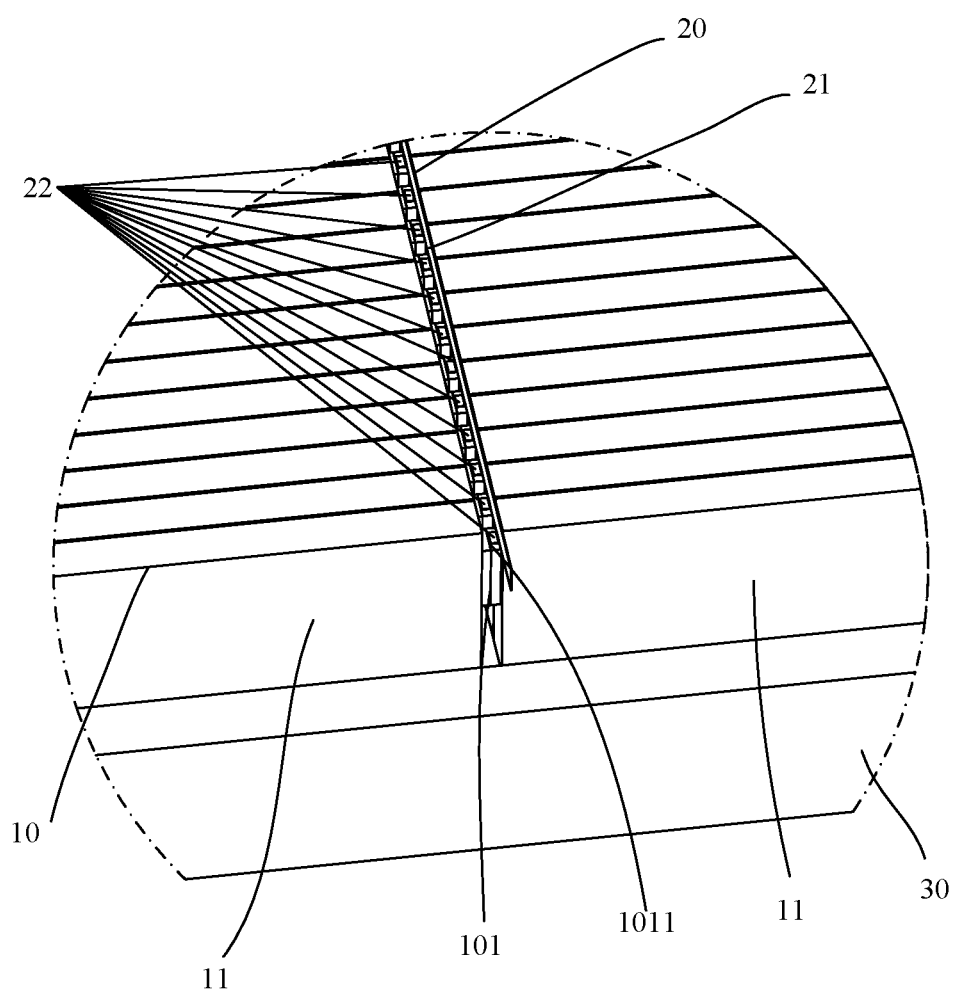
FIG. 15 is a schematic diagram of an enlarged structure of Part B in FIG. 14.

As shown in FIG. 14 and FIG. 15, in this embodiment, the plurality of battery pairs 10 are arranged into a pack with each battery pair 10 connected as one group, where each battery pair 10 connected as one group is electrically connected to the main board 21 through one sampling piece 22.

For any other parts not illustrated in the embodiment shown in FIG. 14 and FIG. 15, refer to the related content in other embodiments.

As can be seen from the above description, the batteries in the foregoing embodiments of this disclosure have at least one of the following advantages:

In the related technologies, in order to meet the requirements for current flowing and welding, an aluminum connecting piece welded on a pole of a battery cell is often thick and large in size, occupying more spaces. However, due to a size of the pole, an actual current flowing area at a weld joint is limited, and the battery cell tends to heat up during charging and discharging, resulting in a temperature higher at the aluminum connecting piece than that at the battery cell. In the embodiments of this disclosure, two battery cells are arranged into a pack to form a battery pair 10, and two opposite poles 111 of the two battery cells 11 in each battery pair 10 abut against each other to form a pole assembly structure 101. In this way, an aluminum connecting piece in the related technologies which is configured to connect the poles of the battery cells is canceled, and the two poles of the battery cells in the battery pair can abut against each other to realize electrical connection of the battery cells. As a result, no extra space is wasted, and aluminum connecting pieces and space required for welding the aluminum connecting pieces are saved. Because the two poles directly abut against each other, a current flowing area is increased, heat generated during current flowing is reduced, and heat generated at the poles during charging and discharging of the battery cells is reduced, which helps to improve performance and service life of the battery.

The poles of the two battery cells 11 of the battery pair 10 are welded, so that the two battery cells 11 are connected into an integral structure with increased strength. With arrangement of a plurality of battery pairs 10 in the battery, strength of the battery pack can be increased. With the poles of the battery cells being welded, the battery cells are arranged into groups, which can increase module size and integration level. With the related process scheme, quick boxing and quick grouping can be realized, and production efficiency can be improved.

The pole assembly structure 101 is provided with an insertion slot 1011, and a sampling piece 22 of an information collector 20 is inserted into the insertion slot 1011 and electrically connected with the pole assembly structure 101. In this way, the pole assembly structure can meet a demand for arranging sampling points without occupying any additional space while satisfying a demand for current flowing.

A size of the insertion slot 1011 fits with a shape of an insertion portion of the sampling piece 22, which helps to increase a contact area between the sampling piece 22 and the pole assembly structure 101 and ensures accurate positioning between the sampling piece 22 and the pole assembly structure 101. In this way, the sampling piece 22 can collect battery parameter signals stably and accurately, improving overall sampling reliability.

The sampling piece 22 is provided with a bending section, which not only achieves welding of the sampling point but also avoids a sampling problem caused by poor welding of the sampling piece 22. In addition, the bending section can prevent the weld joint from being peeled due to stress, increasing connection reliability of the sampling piece 22.

The information collector 20 is arranged in an accommodation space between the two battery cells of the battery pair 10, occupying no space in a height direction of the poles 111 of the battery cells 11, so that overall space utilization of the battery pack can be increased.

In this way, the accommodation space in the height direction of the poles can be fully utilized to place the main board 21 of the information collector 20, thereby improving the overall space utilization of the battery This disclosure further provides an electric device, including the battery according to the embodiments of this disclosure, where the battery is configured to supply electric energy. The electric device according to this embodiment of this disclosure has the same advantages as the battery according to the embodiments of this disclosure.

Figure 16:
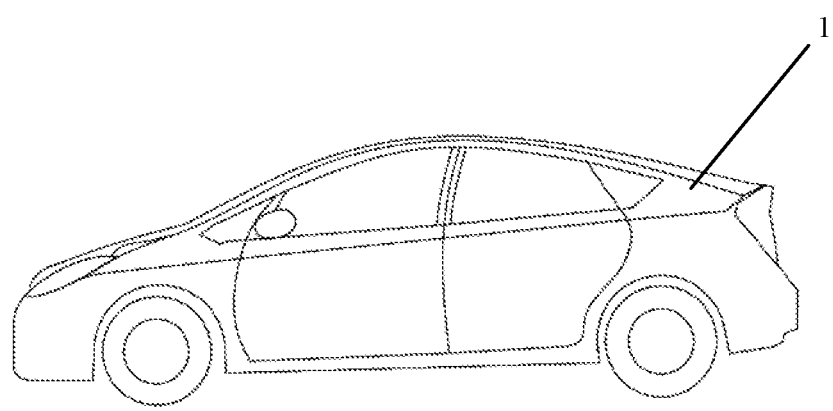
FIG. 16 is a schematic structural diagram of an electric device according to an embodiment of this disclosure.

FIG. 16 shows an electric device according to an embodiment of this disclosure, where the electric device uses a battery as a power source and is specifically a vehicle 1. As the power source of the vehicle 1, the battery provides power for the vehicle 1 or for other electricity requirements, for example, electric control, lighting, and temperature regulation.

An embodiment of this disclosure further provides a preparation method of battery, including: providing a battery pair 10, where the battery pair 10 includes two battery cells 11, the battery cell 11 includes a first surface 110 provided with a pole 111, the poles 111 provided on the first surfaces 110 of the two battery cells 11 abut against each other face to face to form a pole assembly structure 101, and the pole assembly structure 101 includes an insertion slot 1011; providing an information collector 20 configured to collect parameters of the battery, where the information collector 20 includes a main board 21 and a sampling piece 22 electrically connected to the main board 21; and extending one end of the sampling piece 22 into the insertion slot 1011, where a free end of the sampling piece 22 is electrically connected to the pole assembly structure 101.

In some embodiments, the preparation method of battery further includes: welding the two poles 111 of the pole assembly structure 101 to each other; and/or welding the sampling piece 22 to the pole assembly structure 101.

In some embodiments, the providing a battery pair 10 may include: forming an opening of the insertion slot 1011, on a surface of the pole assembly structure 101 at a side closer to the main board 21; and/or forming an opening of the insertion slot 1011, on a surface of the pole assembly structure 101 adjacent to the surface at the side closer to the main board 21.

In some embodiments, the providing a battery pair 10 may further include: forming a recess 1111 on one of the poles 111 of the pole assembly structure 101 to form the insertion slot 1011; and/or forming a recess 1111 on both of the poles 111 of the pole assembly structure 101 to form the insertion slot 1011.

The preparation method of battery according to this embodiment of this disclosure has the same advantages as the batteries according to the embodiments of this disclosure.

Although this disclosure has been described with reference to some embodiments, various modifications can be made to this disclosure without departing from the scope of this application and the components therein can be replaced with equivalents. In particular, as long as there is no structural conflict, the various technical features mentioned in the embodiments can be combined in any manner. This disclosure is not limited to the specific embodiments disclosed in this specification, but includes all technical solutions falling within the scope of the claims.

The invention claimed is:

1. A battery, comprising:
a battery pair comprising a first battery cell and a second battery cell, wherein the first battery cell comprises a first surface provided with a first pole, the second battery cell comprises a second surface provided with a second pole, the first pole and the second pole abut against each other face to face to form a pole assembly structure, and the pole assembly structure comprises an insertion slot; and
an information collector configured to collect parameters of the battery, wherein the information collector comprises a main board and a sampling piece electrically connected to the main board, one end of the sampling piece extending into the insertion slot and being electrically connected to the pole assembly structure.

2. The battery according to claim 1, wherein an accommodation space is formed between the first surface of the first battery cell and the second surface of the second battery cell, and the main board is located in the accommodation space.

3. The battery according to claim 1, wherein the one end of the sampling piece fits with the insertion slot in shape.

4. The battery according to claim 1, wherein:
the first pole and the second pole of the pole assembly structure are welded to each other; and/or
the sampling piece is welded to the pole assembly structure.

5. The battery according to claim 1, wherein:
the insertion slot has an opening on a third surface of the pole assembly structure at a first side close to the main board; and/or
the insertion slot has an opening on a fourth surface of the pole assembly structure adjacent to the third surface of the pole assembly structure.

6. The battery according to claim 1, wherein the insertion slot is a through slot or a bottomed slot.

7. The battery according to claim 1, wherein the insertion slot is located between the first pole and the second pole and comprises a recess provided on at least one of the first pole and the second pole.

8. The battery according to claim 7, wherein:
the first pole and the second pole comprise an aluminum pole and a copper-aluminum composite pole, wherein
the recess is provided on the aluminum pole, with an end of the recess opposite an opening of the insertion slot being closed; and/or
the recess is provided on the copper-aluminum composite pole, with an end of the recess opposite the opening of the insertion slot being open.

9. The battery according to claim 1, comprising a plurality of such battery pairs, the plurality of battery pairs being arranged side by side, wherein
the plurality of battery pairs are arranged into a pack with multiple battery pairs connected in parallel as one group, wherein the multiple battery pairs connected in parallel as one group are electrically connected to the main board through at least one sampling piece; and/or
the plurality of battery pairs are arranged into a pack with each battery pair connected in parallel as one group, wherein each battery pair connected in parallel as one group is electrically connected to the main board through one sampling piece.

10. The battery according to claim 1, wherein a part of the sampling piece outside the insertion slot comprises a bending portion.

11. The battery according to claim 1, wherein an outer edge of the main board at a side away from the pole assembly structure is located inward from an outer edge of the first surface.

12. An electric device, comprising the battery according to claim 1, wherein the battery is configured to supply electric energy.

13. A battery preparation method, comprising:
providing a battery pair, wherein the battery pair comprises a first battery cell and a second battery cell, the first battery cell comprises a first surface provided with a first pole, the second battery cell comprises a second surface provided with a second pole, the first pole and the second pole abut against each other face to face to form a pole assembly structure, and the pole assembly structure comprises an insertion slot;
providing an information collector, wherein the information collector is configured to collect parameters of the battery and comprises a main board and a sampling piece electrically connected to the main board; and
extending one end of the sampling piece into the insertion slot, and electrically connecting a free end of the sampling piece to the pole assembly structure.

14. The preparation method according to claim 13, comprising:
welding the first pole and the second pole of the pole assembly structure to each other; and/or
welding the sampling piece to the pole assembly structure.

15. The preparation method according to claim 13, wherein providing the battery pair comprises:
forming an opening of the insertion slot on a third surface of the pole assembly structure at a first side close to the main board; and/or
forming an opening of the insertion slot on a fourth surface of the pole assembly structure adjacent to the third surface.

16. The preparation method according to claim 13, wherein providing the battery pair comprises:
forming a recess on one of the first pole and the second pole of the pole assembly structure to form the insertion slot; and/or forming a recess on each of the first pole and the second pole of the pole assembly structure to form the insertion slot.

* * * * *